United States Patent [19]

Hayasaka et al.

[11] Patent Number: 5,312,608
[45] Date of Patent: May 17, 1994

[54] EXHAUST GAS PURIFYING CATALYST AND AN EXHAUST GAS PURIFYING METHOD USING THE CATALYST

[75] Inventors: Toshiaki Hayasaka; Takuma Kimura, both of Sodegaura, Japan

[73] Assignee: Idemitsu Kosan Company Limited, Tokyo, Japan

[21] Appl. No.: 58,425

[22] Filed: May 7, 1993

Related U.S. Application Data

[62] Division of Ser. No. 783,628, Oct. 24, 1991, Pat. No. 5,238,890.

[30] Foreign Application Priority Data

Oct. 31, 1990 [JP] Japan ................... 2-296242
May 28, 1991 [JP] Japan ................... 3-154140
Jun. 14, 1991 [JP] Japan ................... 3-169242

[51] Int. Cl.$^5$ .......................... B01D 53/34; B01J 8/02
[52] U.S. Cl. .............................. 423/213.5; 423/213.2; 423/239.2

[58] Field of Search ............ 423/213.5, 213.2, 239, 423/239 Z; 502/61

[56] References Cited

U.S. PATENT DOCUMENTS 3,565,574 2/1971 Kearby et al. ............... 423/213.2
3,787,560 1/1974 Stephens ..................... 423/213.2

FOREIGN PATENT DOCUMENTS 0507656 10/1992 European Pat. Off. ......... 502/61
3101836 4/1991 Japan ....................... 423/213.2

*Primary Examiner*—Carl F. Dees
*Attorney, Agent, or Firm*—Flynn, Thiel, Boutell & Tanis

[57] ABSTRACT

The catalyst for purifying an exhaust gas has at least gallium and a zeolite and an exhaust gas purifying method using the catalyst. Nitrogen oxides in the exhaust gas are reduced and eliminated by the catalyst in an oxidative atmosphere at a reaction temperature of 200° to 800° C. and under the presence of a hydrocarbon at the total THC concentration/$NO_x$ concentration of from 0.5 to 50.

3 Claims, 1 Drawing Sheet

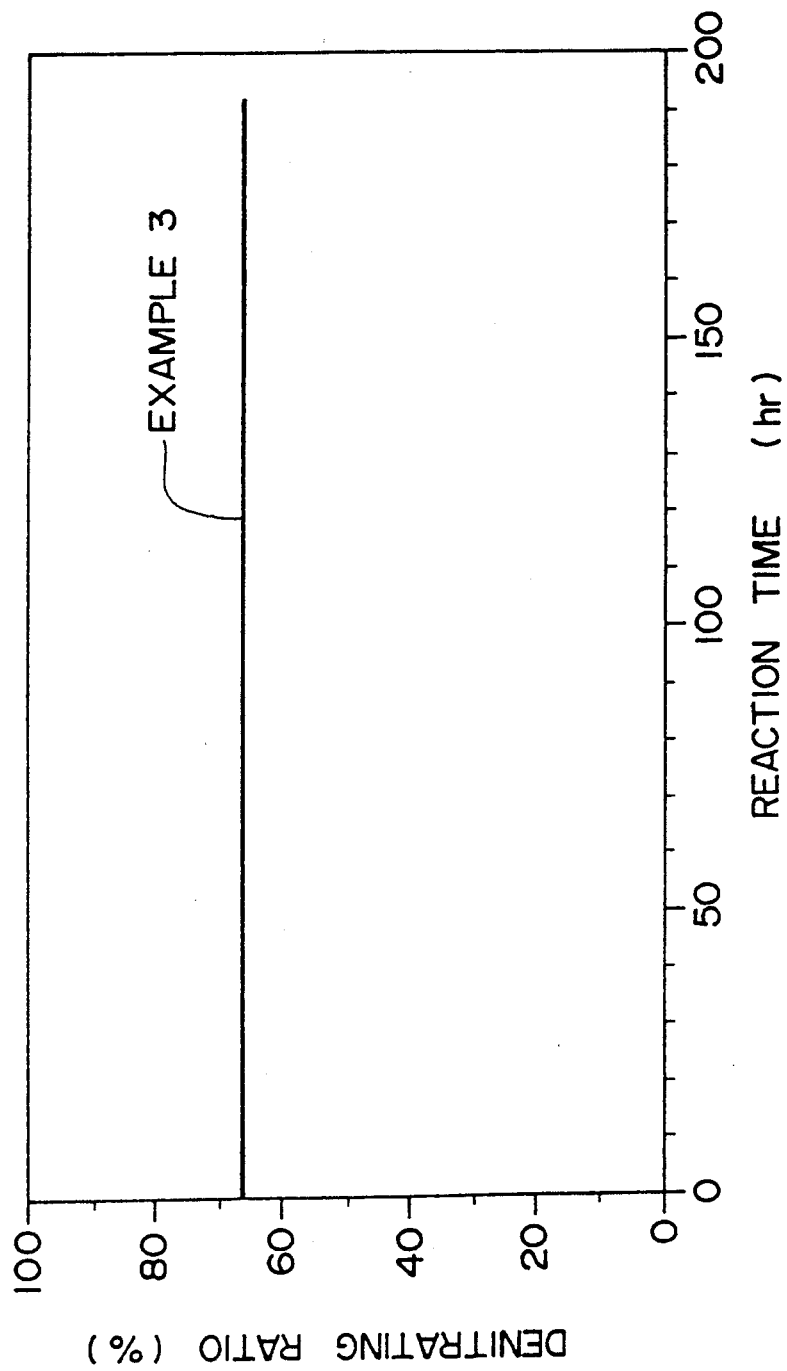

EXHAUST GAS PURIFYING CATALYST AND AN EXHAUST GAS PURIFYING METHOD USING THE CATALYST

This is a division of Ser. No. 07/783,628, filed Oct. 24, 1991, now U.S. Pat. No. 5,238,890.

BACKGROUND OF THE INVENTION

1. FIELD OF THE INVENTION

The present invention concerns an exhaust gas purifying catalyst which decomposes, into non-toxic gases, nitrogen oxides discharged from mobile internal combustion engines used, for example, in diesel cars, stationary internal combustion engines used, for example, in cogeneration systems and various industrial furnaces such as boilers, as well as a method of purifying the exhaust gas using such catalyst.

2. DESCRIPTION OF THE RELATED ART

Generally, exhaust gases discharged from automobiles, stationary internal combustion engines and various industrial furnaces contain a great amount of nitrogen oxides represented by NO and $NO_2$ ($NO_x$). It is said that such $NO_x$ not only causes photochemical smog but also induces disease in man's respiratory organs.

As a method of decreasing $NO_x$, an exhaust gas processing technique of a so-called ternary catalyst system is established that eliminates $NO_x$ by reduction in an exhaust gas of low oxygen content, such as that from gasoline cars, by using a reducing agent such as carbon monoxide or hydrocarbon.

On the other hand, in the case of an exhaust gas containing a great amount of oxygen, such as that discharged from large-scaled stationary exhaust emission sources such as boilers, a selective $NO_x$ reduction process for decreasing the amount of $NO_x$ by external addition of ammonia is now under actual operation, which produces some effect.

However, the former method is applicable only to an exhaust gas from a gasoline engine in which the oxygen concentration is extremely low whereas the latter method is difficult to use in small-sized stationary exhaust emission sources or mobile exhaust emission sources from a standpoint of handling because ammonia is used.

In view of the above, various methods have been studied for using hydrogen, carbon monoxide or various hydrocarbons as reducing agents other than ammonia but most of them have the drawback that they are a non-selective catalytic reduction process which can eliminate nitrogen oxides only after oxygen in the exhaust gas has been consumed completely.

Although the following methods have been proposed so far as a novel selective catalytic reduction process capable of overcoming such a drawback (a method of selectively reducing and eliminating nitrogen oxides even under the coexistence of oxygen), none of them can provide quite satisfactory results.

That is, Japanese Patent Laid-Open Hei 2-149317 proposes a method of using (1) a catalyst comprising a hydrogen type mordenite or clinoptilolite or (2) a catalyst comprising a hydrogen type mordenite or clinoptilolite carrying a metal such as Cu, Cr, Mn, Fe and Ni, and bringing an exhaust smoke containing oxygen resulting from combustion of various fuels into contact with the above-mentioned catalyst under the coexistence of an organic compound thereby eliminating nitrogen oxides in the exhaust smoke.

According to this method, a denitrating ratio of 30 to 60% is obtained under the conditions of a reaction temperature of 300 to 600° C. and a gas hourly space velocity (GHSV) of 1200 $h^{-1}$, but a denitrating effect under a high GHSV condition, i.e., a condition approximate to that of practical use is not clear. Further, the literatures gives no description of the aging of the catalytic activity and the life of the catalyst is not clear. Further, since the catalyst is evaluated for a pseudo exhaust gas containing no $SO_x$, the resistance of the catalyst to $SO_x$ is uncertain.

Japanese Patent Laid-Open Hei 1-130735 proposes a method of using a catalyst in which a zeolite ion-exchanged with a transition metal (Cu, Co, Ni, Fe, Mg, Mn or the like) is carried on a refractory support, and capable of purifying nitrogen oxides even in an oxidative atmosphere.

This is a method of purifying nitrogen oxides in an exhaust gas from a gasoline engine at high efficiency even in a lean air/fuel ratio region, in which the oxygen concentration in the exhaust gas is only about 3% at the highest. Accordingly, it is uncertain whether or not nitrogen oxides can be selectively denitrated by reduction also in an exhaust gas such as that from a diesel engine in which the oxygen concentration is from 5 to 10%. Also in the examples, the $NO_x$ reduction tends to be lowered greatly along with an increase in the oxygen concentration.

Japanese Patent Laid-Open Sho 63-283727 proposes a method of using a catalyst in which a metal such as Cu, V, Mn, Fe or Cr is carried on a hydrophobic zeolite with a $SiO_2/Al_2O_3$ ratio of 15 or more and decreasing nitrogen oxides in an oxygen containing exhaust gas from an internal combustion engine under the presence of carbon monoxide and one kind or more of hydrocarbons.

In this method, the denitrating ratio is decreased to as low a value as 4 to 26% in the case of using a zeolite catalyst carrying a metal other than copper. On the other hand, in the case of using a copper-zeolite catalyst, there is the problem that the copper ingredient is readily poisoned by $SO_x$ though a relatively high activity can be obtained. The oxygen concentration in the exhaust gas shown in the examples is 1.6% and it is uncertain whether or not nitrogen oxides can also be reduced selectively for denitration if the oxygen concentration is higher, for example, as in an exhaust gas from a diesel engine.

Japanese Patent Laid-Open sho 63-100919 proposes a method of using a catalyst in which copper is carried on a porous support such as of alumina, silica or zeolite and eliminating nitrogen oxides in an exhaust gas containing oxygen in the presence of a hydrocarbon.

In this method, the denitrating ratio is from 10 to 25% and no high denitrating activity is obtainable. Further, since the catalyst contains copper, there is the problem that the copper ingredient is readily poisoned by $SO_x$. Further, the oxygen concentration in the exhaust gas shown in the examples is 2.1% and it is uncertain whether or not nitrogen oxides can also be reduced selectively for denitration if the oxygen concentration is higher.

SUMMARY OF THE INVENTION

The exhaust gas purifying catalyst according to the first invention is an catalyst for reducing and eliminating nitrogen oxides in the exhaust gas in an oxidative atmosphere, the catalyst containing gallium as a main catalyst, and a zeolite as a promoter.

The exhaust gas purifying catalyst according to the second invention is an catalyst for reducing and eliminating nitrogen oxides in the exhaust gas in the presence of a hydrocarbon in an oxidative atmosphere, the catalyst comprising (1) gallium as a main catalyst, (2) at least one selected from iron, nickel, cobalt, zirconium, manganese, chromium, molybdenum, copper, cerium, titanium, niobium and rare earth elements among transition elements as a promoter and (3) a zeolite.

The exhaust gas purifying catalyst according to the third invention is an catalyst for reducing and eliminating nitrogen oxides in the exhaust gas in the presence of a hydrocarbon in an oxidative atmosphere, the catalyst comprising (1) gallium as a main catalyst, (2) at least one of alkali metal elements and alkaline earth metal elements as a promoter and (3) a zeolite.

The oxidative atmosphere means herein an atmosphere containing an amount of oxygen in excess of that required for completely oxidizing carbon monoxide, hydrogen and hydrocarbon contained in an exhaust gas and a reducing substance of a hydrocarbon added as required in this process and converting them into $H_2O$ and $CO_2$.

As the Ga source for the gallium (Ga), any of compounds convertible into oxides upon preparation of the catalyst or during use thereof for reaction may be used. Such a compound includes Ga-nitrate, -sulfate, -oxide, -halide, -carbonate, -hydroxide and -organic acid salt.

The content of gallium in the catalyst is usually from 0.01 to 10% by weight, preferably, 0.1 to 5% by weight of the entire catalyst when converted to an oxide. If the content is less than 0.01% by weight, enough catalytic activity is not obtained. On the other hand, if the content exceeds 10% by weight, no further improvement to the catalyst activity can be observed.

While there is no particular restriction on the kind of the zeolite, it is preferred to use a zeolite with a Si/Al ratio (atom ratio) of 5 or more when it is used for the reaction or a zeolite with a Si/(Al+M) ratio (atom ratio) of 5 or more where Al atoms are partially or wholly replaced with an element (M) such as B, P, Ti, for example, MFI or MEL type zeolite such as ZSM-5, ZSM-8, ZSM-11 and Silicalite, or MTT, FER or OFL type zeolite. If the Si/Al or Si/(Al+M) ratio (atom ratio) is less than 5, the heat resistance of the zeolite is relatively low, so that there is a probability that the life of the catalyst will be shortened.

As iron, nickel, cobalt, zirconium, manganese, chromium, molybdenum, copper, cerium, titanium, niobium and rare earth elements, any of compounds convertible into oxides upon preparation of the catalyst or during use thereof for reaction can be used. Such a metal compound can include, for example, nitrate, sulfate, oxide, halide, carbonate, hydroxide and organic acid salt of these metal elements.

The content of the promoter in the catalyst is usually from 0.01 to 20% by weight and, preferably, from 0.03 to 10% by weight the of the entire catalyst. If the content is less than 0.01% by weight, high purification ratio inherent to the present invention is not obtain. On the other hand even if it exceeds 20% by weight, no further improvement to the purification ratio can be observed.

As the alkali metal elements (Li, Na, K or the like) and the alkaline earth metal elements (Mg, Ca, Sr, Ba or the like), any of compounds convertible into oxides upon preparation of the catalyst or during use thereof for reaction can be used. Such a compound can include, for example, nitrate, sulfate, oxide, halide, carbonate, hydroxide and organic acid salt of these metal elements.

The content of these promoters in the catalyst is usually from 0.01 to 1% by weight and, preferably, from 0.05 to 0.5% by weight of the entire catalyst when converted to an oxide. If the content is less than 0.01% by weight or more than 1 by weight, as mentioned, sufficient catalytic activity is not obtained.

The Ga and promoters may be present in an optional form in the catalyst and take the following forms. For instance, they may be contained as constituents of a zeolite (for example, ion-exchanging cations, substituent atoms in the framework, or various forms due to modification by processing upon preparation, pre-treatment and during reaction of the catalyst). Alternatively, the Ga and promoters may be incorporated into the catalyst, carried on a support comprising the zeolite containing Ga and the promoters described above, a zeolite containing no Ga or a mixture thereof, for example, by means of ion exchange, impregnation or gas phase deposition or they may be incorporated in a form physically mixed with the above-mentioned zeolite. Further, various metals may be carried on them. They are, preferably, formulated as a gallometallo silicate zeolite, gallosilicate zeolite or a zeolite modified therefrom.

The catalyst may be in an optional shape, for example, a pellet, plate, column, honey comb or lattice.

The catalyst according to the present invention can be prepared, for example, by using compounds containing the Ga and promoters to a zeolite by means of ion-exchange, impregnation, physical mixing or gas phase deposition. Alternatively, compounds of the Ga and promoter may be incorporated into a gel upon synthesis of the zeolite simultaneously. Further, a catalyst preparation method of coating a catalyst on a lattice-like support such as that of cordierite, mullite or aluminum or on a substrate made of metal gauge may be adopted.

A method of purifying an exhaust gas according to the present, invention has a feature of bringing an exhaust gas in the presence of a hydrocarbon in an oxidative atmosphere into contact with the catalyst and eliminating nitrogen oxides in the exhaust gas by reducing them into $N_2$ and $H_2O$.

The hydrocarbon described above may be a hydrocarbon remaining in the exhaust gas, but it is preferred to add a hydrocarbon from the outside if the amount of the hydrocarbon is less than the amount required for causing the denitrating reaction or if it is not contained at all in the exhaust gas.

There is no particular restriction on the kind of the hydrocarbon to be added for this purpose and they may be methane, LPG, gasoline, gas oil, kerosene, A heavy oil or the like.

The amount of the hydrocarbon present in the exhaust gas is from 0.5 to 50, preferably, 1 to 20, as indicated by the THC concentration/$NO_x$ concentration. The THC (Total HydroCarbon) concentration means a concentration of a hydrocarbon as converted into that of methane. For instance, if the $NO_x$ concentration is 1000 ppm, the THC concentration is from 0.05 to 5.0%.

If the amount of the hydrocarbon present is lower than the above-mentioned lower limit, no denitrating effect appears. If it is higher than the above-mentioned upper limit, it is not preferred because the reduction of the economical performance of the entire system or abnormal heat generation in the catalyst bed caused by the combustion heat of the hydrocarbon, although the denitrating ratio is increased.

The catalytic reaction temperature is set to 200 to 800° C., and preferably, 300 to 600° C. Usually, the denitrating ratio is increased as the temperature is higher, but, if it exceeds 800° C., undesirable degradation of the catalyst occurs and, on the other hand, the denitrating ratio is lowered if the temperature is lower than 200° C.

The gas hourly space velocity (GHSV) is set usually to 2,000 to 200,000 h$^{-1}$, and preferably, 5,000 to 100,000 h$^{-1}$. If the GHSV is less than 2,000 h$^{-1}$, the amount of the catalyst used is increased though the denitrating ratio is high and, on the other hand, if it is greater than 200,000 h$^{-1}$, the denitrating ratio is lowered.

Exhaust gases as the object of the purification method according to the present invention are those gases containing $NO_x$ and oxygen and are exhaust gases discharged from mobile internal combustion engines such as gasoline cars which perform lean combustion condition or diesel cars, stationary internal combustion engines such as cogeneration, boilers, and various kinds of industrial furnaces.

BRIEF DESCRIPTION OF THE DRAWINGS

FIG. 1 is a graph of a measured life of the catalyst used in Example 3.

DETAILED DESCRIPTION OF THE PREFERRED EMBODIMENT(S)

EXAMPLE 1

A solution comprising 7.6 g of aluminum sulfate, 6.9 g of gallium nitrate, 26.4 of tetrapropylammonium bromide, 15.0 g of sulfuric acid (97%) and 250 ml of water (referred to as a solution I); a solution comprising 214 g of water glass ($SiO_2$:28.4%, $Na_2O$: 9.5%) and 212 ml of water (referred to as a solution II); and a solution comprising 80 g of sodium chloride and 122 ml of water (referred to as a solution III) were at first provided.

Then, the solutions I and II were gradually dropped into and mixed with the solution III. The mixed solution was adjusted to Ph 9.5 with sulfuric acid, charged in a one liter autoclave and left for 20 hours under an autogenous pressure at a temperature of 170° C. and under stirring at 300 rpm. The mixed solution was cooled, filtered and precipitates were washed sufficiently with an excess amount of purified water. Subsequently, they were dried at 120° C. for 20 hours to synthesize a galloaluminosilicate zeolite of a ZSM-5 structure.

Subsequently, the zeolite was calcined in an air stream at 540° C. for 3 hours. Then, it was subjected to ion-exchange by using 1N—$NH_4NO_3$ solution at 80° C. for 2 hours, filtration, washing with water, drying at 120° C. and calcination in an air stream at 540° C. for 3 hours, to ion-exchange by using 1N—$NH_4NO_3$ solution at 80° C. for 2 hours, filtration, washing with water and drying at 120° C. repeatedly and then calcination in an air stream at 720° C. for 3 hours. The galloaluminosilicate zeolite thus obtained had an elemental composition of $SiO_2$:$Al_2O_3$:$Ga_2O_3$=80:1:0.7 by molar ratio.

Then, after charging 60 cc of the catalyst precursor into a tubular reactor made of stainless steel, the temperature was elevated while introducing dry air at GHSV=5,000 h$^{-1}$, and it was treated at 500° C. for 30 min to prepare a catalyst of this example.

Then, a gas formed by adding an LPG gas to a diesel exhaust gas as a gas for disposal was introduced at GHSV=5,000 h$^{-1}$ through a tube kept at 200° C. into the tubular reactor kept at 400° C. The composition of the diesel exhaust gas was: $NO_x$:1000 ppm, $O_2$:8%, $So_x$:140 ppm, $CO_2$:10% and THC:230 ppm. Further, the LPG gas was added such that the total hydrocarbon in the gas for disposal was 0.07% (THC concentration: 0.21%). As a result, the THC concentration/$NO_x$ concentration was 2.1. Then, the gas from the exit of the tubular reactor was introduced through a tube also kept at 200° C. into a chemical luminescence analyzer and the $NO_x$ concentration was measured. The $NO_x$ eliminating ratio from the exhaust gas after the catalytic reaction was calculated by measuring and comparing the $NO_x$ concentration before and after the introduction to the tubular reactor. The results are shown in Table-1 below.

EXAMPLES 2–4

Exhaust gas was purified in the same manner as in Example 1 except for changing, as shown below, the composition of the gas for disposal introduced into the tubular reactor charged with the catalyst and the NO eliminating ratio was evaluated in each of the examples. The results are shown in Table-1 below.

The gas for disposal introduced in Example 2 was obtained by adding an LPG gas to the diesel exhaust gas in Example 1 such that the total hydrocarbon was 0.14% (THC concentration: 0.42%) in the gas for disposal.

The gas for disposal introduced in Example 3 was obtained by adding an LPG gas to the diesel exhaust gas in Example 1 such that the total hydrocarbon was 0.28% (THC concentration: 0.84%) in the gas for disposal.

In Example 3, the $NO_x$ eliminating ratio was also measured with the reaction time to evaluate the catalyst life. The results are shown in FIG. 1.

The gas for disposal introduced in Example 4 was obtained by adding an LPG gas to the diesel exhaust gas in Example 1 such that the total hydrocarbon was 0.56% (THC concentration: 1.68%) in the gas for the disposal.

EXAMPLE 5

An aluminosilicate zeolite of ZSM-5 structure was synthesized in the same procedures as those in Example 1 except for changing the composition of the solution I in Example 1 to the composition of a solution including 7.6 g of aluminum sulfate, 26.4 g of tetrapropyl ammonium bromide, 17.6 g of sulfuric acid (97%) and 250 ml of water.

Then, the zeolite was calcined in an air stream at 540° C. for 3 hours. Then, it was subjected to ion-exchange by using 1N—$NH_4O_3$ solution at 80° C. for 2 hours, filtration, washing with water, drying at 120° C. and calcination in an air stream at 540° C. for 3 hours, to ion exchange by using 1N—$NH_4NO_3$ solution at 80° C. for 2 hours, filtration, washing with water and drying at 120° C. repeatedly and then to calcination in an air stream at 720° C. for 3 hours.

Then, the aluminosilicate zeolite was impregnated with a gallium nitrate solution by an ordinary impregnation method to support gallium on the zeolite. The Ga supporting zeolite thus obtained had an elemental composition of $SiO$:$Al_2O_3$:$Ga_2O_3$=80:1:0.7 (molar ratio).

Then, after charging 60 cc of the catalyst precursor into a tubular reactor made of stainless steel, the temperature was gradually elevated while introducing dry air at GHSV =5000 h$^{-1}$, and it was then treated at 500° C. for 30 min to prepare a catalyst of this example.

Then, the NO$_x$ eliminating ratio was evaluated in the same manner as in the examples described above by using a gas prepared by adding an LPG gas to the same diesel exhaust gas as in the above-mentioned examples for the gas for disposal such that the total hydrocarbon was 0.07% (THC concentration: 0.21%) in the gas for disposal. The results are shown in Table-1.

EXAMPLES 6 to 8

Exhaust gas was purified in the same manner as in Example 5 except for changing, as shown below, the composition of the gas for disposal introduced into the tubular reactor charged with the catalyst and the NO$_x$ eliminating ratio was evaluated in each of the examples. The results are shown in Table-1 below.

The gas for disposal introduced in Example 6 was obtained by adding an LPG gas to the diesel exhaust gas in Example 1 such that the total hydrocarbon was 0.14% (THC concentration: 0.42%) in the gas for disposal.

The gas for disposal introduced in Example 7 was obtained by adding an LPG gas to the diesel exhaust gas in Example 5 such that the total hydrocarbon was 0.28% (THC concentration: 0.84%) in the gas for disposal.

The gas for disposal introduced in Example 8 was obtained by adding an LPG gas to the diesel exhaust gas in Example 5 such that the total hydrocarbon was 0.56% (THC concentration: 1.68%) in the gas for disposal.

EXAMPLE 9-16

In the examples 9 to 16, only the temperature of the tubular reactor in Examples 1 to 8 was changed from 400° C. to 500° C., respectively, and the NO$_x$ eliminating ratio of the catalyst in each of the examples was evaluated in the same manner as in the examples described above. The results are shown in Table-1.

COMPARATIVE EXAMPLE 1

After preparing the catalyst in the same procedures as those in Example 1, the NO$_x$ eliminating ratio of the catalyst was evaluated in the same manner as in Example 1 except for introducing a diesel exhaust gas to which no LPG gas was added into the tubular reactor. The results are shown in Table-2.

COMPARATIVE EXAMPLE 2

After preparing the catalyst in the same procedures as those in Example 5, the NO$_x$ eliminating ratio of the catalyst was evaluated in the same manner as in Example 5 except for introducing a diesel exhaust gas to which no LPG gas was added into the tubular reactor. The results are shown in Table-2.

COMPARATIVE EXAMPLE 3

An aluminosilicate zeolite of ZSM-5 structure was synthesized in the same procedures as those in Example 1 except for changing the composition of the solution I in Example 1 to the composition of a solution including 7.6 g of aluminum sulfate, 26.4 g of tetrapropyl ammonium bromide, 17.6 g of sulfuric acid (97%) and 250 ml of water. Then, the zeolite was calcined in an air stream at 540° C. for 3 hours. Then, it was subjected to ion-exchange by using 1N—NH$_4$O$_3$ solution at 80° C. for 2 hours, filtration, washing with water, drying at 120° C. and calcination in an air stream at 540° C. for 3 hours, to ion exchange by using 1N—NH$_4$NO$_3$ solution at 80° C. for 2 hours, filtration, washing with water and drying at 120° C. repeatedly and then to calcination in an air stream at 720° C. for 3 hours. The zeolite thus obtained had an elemental composition of SiO$_2$:Al$_2$O$_3$=80:1 (molar ratio).

Then, after charging 60 cc of the catalyst precursor into a tubular reactor made of stainless steel the temperature was gradually elevated while introducing dry air at GHSV=5000 h$^{-1}$, and it was treated at 500° C. for 30 min to prepare a catalyst of this example.

Then, the NO$_x$ eliminating ratio was evaluated in the same manner as in the examples described above by using a gas prepared by adding an LPG gas to the same diesel exhaust gas as in the above-mentioned examples for the gas for disposal such that the total hydrocarbon was 0.14% (THC concentration: 0.42%) in the gas for disposal. The results are shown in Table-2.

COMPARATIVE EXAMPLE 4

A catalyst was prepared in the same procedures as those in Example 5 except for supporting nickel on the aluminosilicate zeolite instead of gallium in Example 5. The Ni supporting zeolite had an elemental composition of SiO$_2$:Al$_2$O$_3$:NiO=80:1:0.7 (molar ratio). Then, the NO$_x$ eliminating ratio was evaluated in the same manner as in the above-described example. The results are shown in Table-2.

EXAMPLE 17

A gallosilicate zeolite of ZSM-5 structure was synthesized in the same procedures as those in Example 1 except for changing the composition of the solution I in Example 1 to the composition of a solution including 6.9 g of gallium nitrate, 26.4 g of tetrapropyl ammonium bromide, 15.0 g of sulfuric acid (97%) and 250 ml of water.

Then, the zeolite was calcined in an air stream at 540° C. for 3 hours. Then, it was subjected to ion-exchange by using 1N—NNH$_4$O$_3$ solution at 80° C. for 2 hours, filtration, washing with water, drying at 120° C. and calcination in an air stream at 540° C. 3 hours, to ion exchange by using 1N—NH$_4$NO$_3$ solution at 80° C. for 2 hours, filtration, washing with water and drying at 120° C. repeatedly and then to calcination in an air stream at 720° C. for 3 hours.

The gallosilicate zeolite thus obtained had an elemental composition of SiO$_2$:-Ga$_2$O$_3$=80:0.7 (molar ratio).

Then, after charging 60 cc of the catalyst precursor into a tubular reactor made of stainless steel, the temperature was gradually elevated while introducing dry air at GHSV=5000 h$^{-1}$, and it was treated at 500° C. for 30 min to prepare a catalyst of this example.

Then, the NO$_x$ eliminating ratio was evaluated in the same manner as in the examples described above by using a gas prepared by adding an LPG gas to the same diesel exhaust gas as in the above-mentioned examples for the gas for disposal such that the total hydrocarbon was 0.07% (THC concentration: 0.21%) in the gas for disposal. The results are shown in Table-1.

EXAMPLES 18-20

Exhaust gas was purified in the same manner as in Example 17 except for changing, as shown below, the composition of the gas for disposal introduced into the tubular reactor charged with the catalyst and the NO$_x$ eliminating ratio was evaluated in each of the examples. The results are shown in Table-1 below.

The gas for disposal introduced in Example 18 was obtained by adding an LPG gas to the diesel exhaust gas in Example 17 such that the total hydrocarbon was 0.14% (THC concentration: 0.42%) in the gas for disposal.

The gas for disposal introduced in Example 19 was obtained by adding an LPG gas to the diesel exhaust gas in Example 17 such that the total hydrocarbon was 0.28% (THC concentration: 0.84%) in the gas for disposal.

The gas for disposal introduced in Example 20 was obtained by adding an LPG gas to the diesel exhaust gas in Example 17 such that the total hydrocarbon was 0.56% (THC concentration: 1.68%) in the gas for disposal.

COMPARATIVE EXAMPLE 5

After preparing a catalyst in the same manner as in Example 17, the catalyst was evaluated in the same manner as in Example 17 except for introducing a diesel exhaust gas to which no LPG gas was added to the tubular reactor. The results are shown in Table-2 described below.

EXAMPLE 21

Fifty grams of a commercially available Y-type zeolite (TSZ-320 NAA), the trade name of products manufactured by Toyo Soda Co.) were impregnated with an aqueous solution of gallium nitrate by an ordinary impregnation method to support gallium on the zeolite.

Then, after drying the Ga supporting/Y-type zeolite at 120° for 20 hours, it was calcined in an air stream at 540° C. for three hours. The catalyst precursor had an elemental composition of $SiO_2:Al_2O_3:Ga_2O_3 = 5.6:1:0.08$ (molar ratio).

Then, after charging 60 cc of the catalyst precursor into a tubular reactor made of stainless steel, its temperature was gradually elevated while introducing dry air at $GHSV = 5000$ $h^{-1}$, and it was treated at 500° C. for 30 min to prepare a catalyst of this example.

Then, the $NO_x$ eliminating ratio was evaluated in the same manner as in the examples described above by using a gas prepared by adding an LPG gas to the same diesel exhaust gas as in the above-mentioned examples for the gas for disposal such that the total hydrocarbon was 0.07% (THC concentration: 0.21%) in the gas for disposal. The results are shown in Table-1.

EXAMPLES 22-24

Exhaust gas was purified in the same manner as in Example 21 except for changing, as shown below, the composition of the gas for disposal introduced into the tubular reactor charged with the catalyst and the $NO_x$ eliminating ratio was evaluated in each of the examples. The results are shown in Table-1 described below.

The gas for disposal introduced in Example 22 was obtained by adding an LPG gas to the diesel exhaust gas in Example 21 such that the total hydrocarbon was 0.14% (THC concentration: 0.42%) in the gas for disposal.

The gas for disposal introduced in Example 23 was obtained by adding an LPG gas to the diesel exhaust gas in Example 21 such that the total hydrocarbon was 0.28% (THC concentration: 0.84%) in the gas for disposal.

The gas for disposal introduced in Example 24 was obtained by adding an LPG gas to the diesel exhaust gas in Example 21 such that the total hydrocarbon was 0.56% (THC concentration: 1.68%) in the gas for disposal.

COMPARATIVE EXAMPLE 6

After preparing a catalyst in the same manner as in Example 21, the catalyst was evaluated in the same manner as in Example 21 except for introducing a diesel exhaust gas to which no LPG gas was added to the tubular reactor. The results are shown in Table-2 described below.

COMPARATIVE EXAMPLE 7-11

After synthesizing, as a catalyst precursor, a Y-type zeolite supporting no Ga instead of the Ga supporting/Y-type zeolite in Example 21, a catalyst was prepared by using the catalyst precursor in the same procedures as those in Example 21, and the $NO_x$ eliminating ratio was evaluated. The results are shown in Table-2 below. However, the composition of the gas for disposal introduced into the tubular reactor charged with the catalyst was changed as described below.

That is, the gas for disposal introduced in Comparative Example 7 was prepared by adding an LPG gas to the diesel exhaust gas in Example 21 such that the total hydrocarbon was 0.07% (THC concentration: 0.21%) in the gas for disposal.

The gas for disposal introduced in Comparative Example 8 was prepared by adding an LPG gas to the diesel exhaust gas in Example 21 such that the total hydrocarbon was 0.14% (THC concentration: 0.42%) in the gas for disposal.

The gas for disposal introduced in Comparative Example 9 was prepared by adding an LPG gas to the diesel exhaust gas in Example 21 such that the total hydrocarbon was 0.28% (THC concentration: 0.84%) in the gas for disposal.

The gas for disposal introduced in Comparative Example 10 was prepared by adding an LPG gas to the diesel exhaust gas in Example 21 such that the total hydrocarbon was 0.56% (THC concentration: 1.68%) in the gas for disposal.

The gas for disposal introduced in Comparative Example 11 was the diesel exhaust gas in Example 21 to which no LPG gas was added.

As shown in the Tables-1 and 2 according to Examples 1 to 4, as high as a denitrating ratio 35 to 82% is obtained even when the exhaust gas has as high an oxygen concentration as 8% and contains $SO_x$, by using galloaluminosilicate zeolite with a $SiO_2/Al_2O_3$ ratio of 80 as the catalyst and setting the temperature at 400° C., the gas hourly space velocity (GHSV) to 5000 $h^{-1}$ and the THC concentration/$NO_x$ concentration at 2.1 to 16.8. Further, as shown in Examples 9-12, when the reaction temperature is elevated to 500° C., the denitrating ratio is improved by several % in each of the cases. Further, as shown in FIG. 1, according to the results of the measurement of the catalyst life in Example 3, the catalyst of this example shows no reduction in the denitrating ratio even after an elapse of 150 hours of reaction time and that the catalyst has a long life.

In contrast, Comparative Example 1 used the same galloaluminosilicate zeolite as that in Examples 1 to 4, but only as low a denitrating ratio as 3% was obtained since the THC concentration/$NO_x$ concentration was 0.2% upon catalytic reaction.

According to Examples 5 to 8, it can be seen that as high a denitrating ratio as 30 to 75% is obtained by using the
Ga-supporting/aluminosilicate zeolite with a $SiO_2/Al_2O_3$ ratio of 80 as the catalyst and setting the temperature at 400°, the gas hourly space velocity GHSV to 5000 $h^{-1}$ and the THC concentration/$NO_x$ concentration to 2.1–16.8 during catalytic reaction. Further, when the reaction temperature is elevated to 500° C. as in Examples 13 to 16, the denitrating ratio is improved by several % in each of the cases.

In contrast, Comparative Example 2 used the same Ga-supporting/aluminosilicate zeolite as that in Examples 5 to 8, but since the THC concentration/$NO_x$ concentration is 0.2 during catalyst reaction, only as low a denitrating ratio as 2% was obtained. Further, according to Comparative Example 3, since the aluminosilicate zeolite supporting no Ga was used, the denitrating ratio was as low as 19% even if the THC concentration/$NO_x$ concentration is 4.2 during catalytic reaction. According to Comparative Example 4, since the aluminosilicate zeolite supporting Ni instead of Ga was used, the denitrating ratio was as low as 23% even when the THC concentration/$NO_x$ concentration is 4.2 during catalytic reaction.

According to Examples 17 to 20, as high a denitrating ratio as 31 to 79% was obtained by using gallosilicate zeolite with a $SiO_2/Al_2O_3$ ratio of about 5000 as the catalyst and setting the temperature at 400° C., GHSV to 5000 $h^{-1}$ and the THC concentration/$NO_x$ concentration to 2.1 to 16,8.

In contrast, according to Comparative Example 5, the same gallosilicate zeolite as that in Examples 17 to 20 was used, but only as low a denitrating ratio as 3% was obtained since the THC concentration/$NO_x$ concentration was 0.2 during the catalytic reaction.

According to Examples 21 to 24, as high a denitrating ratio as 25 to 57% was obtained by using Ga-supporting/Y-type zeolite with a $SiO_2/Al_2O_3$ ratio of 5.6 as the catalyst and setting the temperature at 400° C., GHSV at 5000 $h^{-1}$ and the THC concentration/$NO_x$ concentration at 2.1 to 16.8.

In contrast, Comparative Example 6 used the same Ga-supporting/Y-type zeolite as that in Examples 21 to 24, but only as low a denitrating ratio as 2% was obtained since the THC concentration/$NO_x$ concentration was 0.2 during catalytic reaction. Further, according to Comparative Examples 7-10, since the Y-type zeolite supporting no Ga was used, only as low a denitrating ratio as 6 to 16% was obtained even when the THC concentration/$NO_x$ concentration was 2.1 to 16.8 during catalytic reaction. Further, according to Comparative Example 11, only as low a denitrating ratio as 2% was obtained since the Y-type zeolite supporting no Ga was used and, in 25 addition, the THC concentration/$NO_x$ concentration was 0.2 during catalytic reaction.

TABLE 1

| | Catalyst system | | | |
|---|---|---|---|---|
| Examples | Reaction temp. (°C.) | LPG addition amount (THC conc. %) | Total THC conc/NOx conc | Denitrating ratio (%) |
| 1 Galloaluminosilicate | 400 | 0.19 | 2.1 | 35 |
| 2 Galloaluminosilicate | 400 | 0.40 | 4.2 | 50 |
| 3 Galloaluminosilicate | 400 | 0.82 | 8.4 | 67 |
| 4 Galloaluminosilicate | 400 | 1.66 | 16.8 | 82 |
| 5 Ga supporting/aluminosilicate | 400 | 0.19 | 2.1 | 30 |
| 6 Ga supporting/aluminosilicate | 400 | 0.40 | 4.2 | 45 |
| 7 Ga supporting/aluminosilicate | 400 | 0.82 | 8.4 | 60 |
| 8 Ga supporting/aluminosilicate | 400 | 1.66 | 16.8 | 75 |
| 9 Galloaluminosilicate | 500 | 0.19 | 2.1 | 40 |
| 10 Galloaluminosilicate | 500 | 0.40 | 4.2 | 55 |
| 11 Galloaluminosilicate | 500 | 0.82 | 8.4 | 77 |
| 12 Galloaluminosilicate | 500 | 1.66 | 16.8 | 90 |
| 13 Ga supporting/aluminosilicate | 500 | 0.19 | 2.1 | 36 |
| 14 Ga supporting/aluminosilicate | 500 | 0.40 | 4.2 | 50 |
| 15 Ga supporting/aluminosilicate | 500 | 0.82 | 8.4 | 71 |
| 16 Ga supporting/aluminosilicate | 500 | 1.66 | 16.8 | 83 |
| 17 Gallosilicate | 400 | 0.19 | 2.1 | 31 |
| 18 Gallosilicate | 400 | 0.40 | 4.2 | 48 |
| 19 Gallosilicate | 400 | 0.82 | 8.4 | 63 |
| 20 Gallosilicate | | 1.66 | 16.8 | 79 |
| 21 Ga supporting/Y-type zeolite | 400 | 0.19 | 2.1 | 25 |
| 22 Ga supporting/Y-type zeolite | 400 | 0.40 | 4.2 | 35 |
| 23 Ga supporting/Y-type zeolite | 400 | 0.82 | 8.4 | 47 |
| 24 Ga supporting/Y-type zeolite | 400 | 1.66 | 16.8 | 57 |

TABLE 2

| | Catalyst system | | | |
|---|---|---|---|---|
| Control Examples | Reaction temp. (°C.) | LPG addition amount (THC conc. %) | Total THC conc/NOx conc | Denitrating ratio (%) |
| 1 Galloaluminosilicate | 400 | 0 | 0.2 | 3 |
| 2 Ga supporting/aluminosilicate | 400 | 0 | 0.2 | 2 |
| 3 Aluminosilicate | 400 | 0.40 | 4.2 | 19 |
| 4 Ni supporting/aluminosilicate | 400 | 0.40 | 4.2 | 23 |
| 5 Gallosilicate | 400 | 0 | 0.2 | 3 |
| 6 Ga supporting/Y-type zeolite | 400 | 0 | 0.2 | 2 |
| 7 Y-type zeolite | 400 | 0.19 | 2.1 | 6 |
| 8 Y-type zeolite | 400 | 0.40 | 4.2 | 10 |
| 9 Y-type zeolite | 400 | 0.82 | 8.4 | 13 |
| 10 Y-type zeolite | 400 | 1.66 | 16.8 | 16 |
| 11 Y-type zeolite | 400 | 0 | 0.2 | 2 |

EXAMPLES 25–28

In order to examine the thermal resistance and durability, the catalysts of Examples 1, 5, 17, 21 were used as catalysts of Examples 25–28 and heated at 500 and 800° C. for 5 hours in an atmosphere of a model gas in an oxygen-excessive lean state of a gasoline car (air-fuel (A/F) ratio is about 22) The composition of the model gas was: CO:0.5%; $O_2$:8%; $H_2$:0.2%; $CO_2$:9%; $C_3H_6$:0.1% (THC: 3000 ppm); and NO:1000 ppm.

The resulting powdered catalysts thus heated were pressed and shaped into pellets with a diameter of about 3 mm. These pellets were filled into an experimental catalyst converter. An exhaust model gas in an excessive-oxygen lean state of a gasoline car was introduced into the converter. The NO purification ratios were measured at 400, 500 and 600° C. The composition of these model gass was: CO:0.1%; $O_2$:4%; $CO_2$10%; $C_3H_6$:0.05%(THC:1500 ppm); and NO:700 ppm. The space rate GHSV in the measurement was about 30,000h$^{-1}$. The respective results of the Examples are shown in Table-3 below.

COMPARATIVE EXAMPLES 12-14

In order to examine the thermal resistance and durability, the catalysts of Comparative Examples 3, 4, 7 were used as catalysts of Comparative Examples 12-14 and heated at 500 and 800° C. for 5 hours in an atmosphere of a model gas as in Examples 25-28.

An exhaust model gas from a gasoline car was introduced into the converter as in the Examples. The NO purification ratios were measured at 400, 500 and 600° C. The respective results of the Comparative Examples are shown in Table-3 below.

TABLE 3

| | Catalyst system | | | |
|---|---|---|---|---|
| | Heating temp. (°C.) | NO purification ratio (%) Reaction temperature (°C.) | | |
| | | 400 | 500 | 600 |
| Examples | | | | |
| 25 Galloalumino silicate | before heated | 34 | 43 | 47 |
| | 500 | 34 | 42 | 46 |
| | 800 | 31 | 40 | 42 |
| 26 Ga supporting/ aluminosilicate | before heated | 29 | 37 | 40 |
| | 500 | 29 | 36 | 40 |
| | 800 | 27 | 34 | 36 |
| 27 Gallosilicate | before heated | 30 | 38 | 42 |
| | 500 | 30 | 37 | 41 |
| | 800 | 27 | 35 | 37 |
| 28 Ga supporting/ Y-type zeolite | before heated | 25 | 31 | 34 |
| | 500 | 25 | 30 | 33 |
| | 800 | 23 | 29 | 30 |
| Comparative Examples | | | | |
| 12 Alumino silicate | before heated | 13 | 16 | 18 |
| | 500 | 13 | 16 | 17 |
| | 800 | 12 | 15 | 16 |
| 13 Ni supporting/ aluminosilicate | before heated | 16 | 19 | 21 |
| | 500 | 16 | 19 | 21 |
| | 800 | 14 | 18 | 19 |
| 14 Y-type zeolite | before heated | 7 | 9 | 9 |
| | 500 | 7 | 8 | 9 |
| | 800 | 6 | 8 | 8 |

It will be seen from Table-3 that any of the catalysts of Examples 25-28 is high in NO purification ratio at 400, 500 and 600° C. compared to the catalysts of Comparative Examples 12-14 and has high durability and high thermal resistance.

EXAMPLE 29

A solution comprising 7.6 g of aluminum sulfate, 6.9 g of gallium nitrate, 26.4 of tetrapropylammonium bromide, 15.0 g of sulfuric acid (97%) and 250 ml of water (referred to as a solution I); a solution comprising 214 g of water glass ($SiO_2$:28.4%, $Na_2O$:9.5%) and 212 ml of water (referred to as a solution II); and a solution comprising 80 g of sodium chloride and 122 ml of water (referred to as a solution III) were at first provided.

Then, the solutions I and II were gradually dropped into and mixed with the solution III. The mixed solution was adjusted to Ph 9.5 with sulfuric acid, charged in a one liter autoclave and left for 20 hours under an autogenous pressure at a temperature of 170° C. and under stirring at 300 rpm. The mixed solution was cooled, filtered and precipitates were washed sufficiently with an excess amount of purified water. Subsequently, they were dried at 120° C. for 20 hours to synthesize a galloaluminosilicate zeolite of a ZSM-5 structure.

Subsequently, the zeolite was calcined in an air stream at 540° C. for 3 hours. Then, it was subjected to ion-exchange by using 1N—$NH_4NO_3$ solution at 80° C. for 2 hours, filtration, washing with water, drying at 120° C. and calcination in an air stream at 540° C. for 3 hours, to ion-exchange by using 1N—$NH_4NO_3$ solution at 80° C. for 2 hours, filtration, washing with water and drying at 120° C. repeatedly and then calcined in an air stream at a 720° C. for 3 hours. Subsequently, the catalyst precursor was impregnated with an iron sulfate (III) solution to support iron on the precursor. The catalyst precursor thus obtained had an elemental composition of $SiO_2$:$Al_2O_3$:$Ga_2O_3$:$Fe_2O_3$=95.2:2.0:2.6:0.2 by weight ratio and $SiO_2$:$Al_2O_3$:$Ga_2O_3$:$Fe_2O_3$=80:1:0.7:0.08 by molar ratio.

Then, after charging 60 cc of the catalyst precursor into a tubular reactor made of stainless steel, the temperature was gradually while for introducing dry air at GHSV=5,000 h$^{-1}$, and the precursor was treated at 500° C. for 30 min to prepare a catalyst of this example.

Then, a gas formed by adding an LPG gas to a diesel exhaust gas as a gas for disposal was introduced at GHSV=5,000 h$^{-1}$ through a tube kept at 200° C. into the tubular reactor kept at 500° C. and an evaluation test was conducted for the catalyst. The composition of the diesel exhaust gas was: $NO_x$:1000 ppm, $O_2$:8%, $SO_x$:140 ppm, CO:400 ppm, $CO_2$:10% and THC:230 ppm. Further, the LPG gas was added by 0.19% at the THC concentration such that the total hydrocarbon in the gas for disposal was 0.21% at the total THC concentration. Accordingly, the total THC concentration/$NO_x$ concentration was 2.1.

Then, the gas from the exit of the tubular reactor was introduced through a tube kept at 200° C. into a chemical luminescence analyzer and the $NO_x$ concentration was measured. The $NO_x$ eliminating ratio of the exhaust gas after the catalytic reaction was calculated by measuring and comparing the $NO_x$ concentration before and after the introduction to the tubular reactor. The results are shown in Table 4 below.

EXAMPLES 30, 31

In Examples 30 and 31, the composition of the gas for disposal introduced into the tubular reactor charged with the catalyst for the evaluation test for the catalyst in Example 29 was changed as shown below. The results of the evaluation of the $NO_x$ eliminating ratio in each of the examples are shown in Table 4.

The gas for disposal introduced in Example 30 was obtained by adding an LPG gas to the diesel exhaust gas in Example 29 such that the total hydrocarbon was 0.42% at the total THC concentration in the gas for disposal.

The gas for disposal introduced in Example 31 was obtained by adding an LPG gas to the diesel exhaust gas in Example 29 such that the total hydrocarbon was 0.84% at the total THC concentration in the gas for disposal.

EXAMPLE 32

In this example, nickel nitrate (II) was used instead of the iron nitrate (III) upon preparing the catalyst in Example 29. The catalyst precursor in this example had an elemental composition of $SiO_2:Al_2O_3:Ga_2O_3:NiO = 95.2:2.0:2.6:0.2$ by weight ratio and $SiO_2:Al_2O_3:Ga_2O_3:NiO = 80:1:0.7:0.16$ by molar ratio.

Subsequently, the $NO_x$ eliminating ratio was evaluated in the same manner as in Example 29 and the results are shown in Table 4.

EXAMPLES 33, 34

In Examples 33 and 34, the composition of the gas for disposal introduced in the tubular reactor charged with the catalyst upon evaluation test of the catalyst in Example 32 was changed as shown below. The results of the evaluation of the $NO_x$ eliminating ratio in each of the examples are shown in Table 4.

The gas for disposal introduced in Example 33 was obtained by adding an LPG gas to the diesel exhaust gas in Example 32 such that the total hydrocarbon was 0.42% at the total THC concentration in the gas for the disposal.

The gas for disposal introduced in Example 34 was obtained by adding an LPG gas to the diesel exhaust gas in Example 32 such that the total hydrocarbon was 0.84% at the total THC concentration in the gas for disposal.

EXAMPLE 35

In this example, cobalt nitrate (III) was used instead of the iron nitrate (III) used for preparing the catalyst in Example 29. The catalyst precursor in this example had an elemental composition of $SiO_2:Al_2O_3:Ga_2O_3:Co_2O_3 = 95.1:2.0:2.6:0.3$ by weight ratio and $SiO_2:Al_2O_3:Ga_2O_3:Co_2O_3 = 80:1:0.7:0.08$ by molar ratio.

Subsequently, the $NO_x$ eliminating ratio was evaluated in the same manner as in Example 29 and the results are shown in Table 4.

EXAMPLES 36, 37

In Examples 36 and 37, the composition of the gas for disposal introduced in the tubular reactor charged with the catalyst in Example 35 was changed as shown below for the evaluation test for the catalyst. The results of the evaluation for the $NO_x$ eliminating ratio in each of the examples are shown in Table 4.

The gas for disposal introduced in Example 36 was obtained by adding an LPG gas to the diesel exhaust gas in Example 35 such that the total hydrocarbon was 0.42% at the total THC concentration in the gas for the disposal.

The gas for disposal introduced in Example 37 was obtained by adding an LPG gas to the diesel exhaust, gas in Example 35 such that the total hydrocarbon of 0.84% was the total THC concentration in the gas for disposal.

EXAMPLE 38

In this example, lanthanum nitrate (III) was used instead of the iron nitrate (III) used upon preparing the catalyst in Example 29. The catalyst precursor in this example had an elemental composition of $SiO_2:Al_2O_3:Ga_2O_3:La_2O_3 = 95.1:2.0:2.6:0.3$ by weight ratio and $SiO_2:Al_2O_3:Ga_2O_3:La_2O_3 = 80:1:0.7:0.04$ by molar ratio.

Subsequently, the $NO_x$ eliminating ratio was evaluated in the same manner as in Example 30 and the results are shown in Table 4.

EXAMPLE 39

In this example, copper nitrate (II) was used instead of the iron nitrate (III) used upon preparing the catalyst in Example 29. The catalyst precursor in this example had an elemental composition of $SiO_2:Al_2O_3:Ga_2O_3:CuO = 95.1:2.0:2.6:0.3$ by weight ratio and $SiO_2:Al_2O_3:Ga_2O_3:CuO = 80:1:0.7:0.17$ by molar ratio.

Subsequently, the $NO_x$ eliminating ratio was evaluated in the same manner as in Example 30 and the results are shown in Table 4.

EXAMPLE 40

In this example, zirconyl nitrate was used instead of the iron nitrate (III) used for preparing the catalyst in Example 29. The catalyst precursor in this example had an elemental composition of $SiO_2:Al_2O_3:Ga_2O_3:ZrO_2 = 95.1:2.0:2.6:0.2$ by weight ratio and $SiO_2:Al_2O_3:Ga_2O_3:ZrO_2 = 80:1:0.7:0.08$ by molar ratio.

Subsequently, the $NO_x$ eliminating ratio was evaluated in the same manner as in Example 30 and the results are shown in Table 4.

EXAMPLE 41 to 43

In these examples 41 to 43, cerium nitrate, titanium chloride and niobium chloride were respectively used instead of the iron nitrate (III) used upon preparing the catalyst in Example 29. Incidentally, methyl alcohol solution is used for the titanium chloride and the niobium chloride. Each of the catalyst precursor in these examples had an elemental composition of $SiO_2:Al_2O_3:Ga_2O_3:CeO_2 = 95.1:2.0:2.6:0.2$, $SiO_2:Al_2O_3:Ga_2O_3:TiO_2 = 95.1:2.0:2.6:0.2$ or $SiO_2:Al_2O_3:Ga_2O_3:Nb_2O_5 = 95.1:2.0:2.6:0.2$ by weight ratio and $SiO_2:Al_2O_3:Ga_2O_3:CeO_2 = 80:1:0.7:0.07$, $SiO_2:Al_2O_3:Ga_2O_3:TiO_2 = 80:1:0.7:0.1$ or $SiO_2:Al_2O_3:Ga_2O_3:Nb_2O_5 = 80:1:0.7:0.04$ by molar ratio.

Subsequently, the $NO_x$ eliminating ratio was evaluated in the same manner as in Example 30 and the results are shown in Table 4.

TABLE 4

| Examples | Catalyst system | Reaction temp. (°C.) | LPG addition amount (THC conc. %) | Total THC conc/ NOx conc | Denitrating ratio (%) |
|---|---|---|---|---|---|
| 29 | Fe supporting/ galloaluminosilicate | 500 | 0.19 | 2.1 | 60 |
| 30 | Fe supporting/ galloaluminosilicate | 500 | 0.40 | 4.2 | 73 |
| 31 | Fe supporting/ galloaluminosilicate | 500 | 0.82 | 8.4 | 95 |
| 32 | Ni supporting/ galloaluminosilicate | 500 | 0.19 | 2.1 | 60 |
| 33 | Ni supporting/ galloaluminosilicate | 500 | 0.40 | 4.2 | 72 |
| 34 | Ni supporting/ galloaluminosilicate | 500 | 0.82 | 8.4 | 93 |
| 35 | Co supporting/ galloaluminosilicate | 500 | 0.19 | 2.1 | 60 |
| 36 | Co supporting/ galloaluminosilicate | 500 | 0.40 | 4.2 | 68 |
| 37 | Co supporting/ galloaluminosilicate | 500 | 0.82 | 8.4 | 90 |
| 38 | La supporting/ galloaluminosilicate | 500 | 0.40 | 4.2 | 65 |

TABLE 4-continued

| | | Catalyst system | | |
|---|---|---|---|---|
| | | Reaction temp. (°C.) | LPG addition amount (THC conc. %) | Total THC conc/ NOx conc | Denitrating ratio (%) |
| 39 | Cu supporting/ galloaluminosilicate | 500 | 0.40 | 4.2 | 70 |
| 40 | Zr supporting/ galloaluminosilicate | 500 | 0.40 | 4.2 | 74 |
| 41 | Ce supporting/ galloaluminosilicate | 500 | 0.40 | 4.2 | 70 |
| 42 | Ti supporting/ galloaluminosilicate | 500 | 0.40 | 4.2 | 71 |
| 43 | Nb supporting/ galloaluminosilicate | 500 | 0.40 | 4.2 | 69 |
| Comparative Examples | | | | | |
| 15 | Fe supporting/ galloaluminosilicate | 500 | 0 | 0.2 | 5 |
| 16 | Ni supporting/ galloaluminosilicate | 500 | 0 | 0.2 | 3 |
| 17 | Co supporting/ galloaluminosilicate | 500 | 0 | 0.2 | 4 |
| 18 | La supporting/ galloaluminosilicate | 500 | 0 | 0.2 | 5 |
| 19 | Cu supporting/ galloaluminosilicate | 500 | 0 | 0.2 | 7 |
| 20 | Zr supporting/ galloaluminosilicate | 500 | 0 | 0.2 | 10 |
| 21 | Fe supporting/ galloaluminosilicate | 500 | 0.40 | 4.2 | 21 |

COMPARATIVE EXAMPLE 15

Using the catalyst as prepared in Example 29, the same evaluation test of the catalyst as in Example 29 was conducted by introducing a diesel exhaust gas to which the LPG gas was not added into the tubular reactor. The results are shown in Table 4.

COMPARATIVE EXAMPLE 16

Using the catalyst as prepared in Example 32, the same evaluation test of the catalyst as in Example 32 was conducted by introducing a diesel exhaust gas to which no LPG gas was added into the tubular reactor. The results are shown in Table 4.

COMPARATIVE EXAMPLE 17

Using the catalyst as prepared in Example 35, the same evaluation test for the catalyst as in Example 35 was conducted by introducing a diesel exhaust gas to which no LPG gas was added into the tubular reactor. The results are shown in Table 4.

COMPARATIVE EXAMPLE 18

Using the catalyst as prepared in Example 38, the same evaluation test for the catalyst as in Example 38 was conducted by introducing a diesel exhaust gas to which no LPG gas was added into the tubular reactor. The results are shown in Table 4.

COMPARATIVE EXAMPLE 19

Using the catalyst as prepared in Example 39, the same evaluation test for the catalyst as in Example 39 was conducted by introducing a diesel exhaust gas to which no LPG gas was added into the tubular reactor. The results are shown in Table 4.

COMPARATIVE EXAMPLE 20

Using the catalyst as prepared in Example 40, the same evaluation test for the catalyst as in Example 40 was conducted by introducing a diesel exhaust gas to which no LPG gas was added into the tubular reactor. The results are shown in Table 4.

COMPARATIVE EXAMPLE 21

A catalyst was prepared in the same procedures as those in Example 29 except for replacing the composition of the solution I in Example 29 with that comprising 7.6 g of aluminum sulfate, 26.4 g of tetrapropylammonium bromide, 17.6 g of sulfuric acid (97%) and 250 ml of water. The catalyst precursor in this Comparative Example had an elemental composition of $SiO_2:Al_2O_3:Fe_2O_3 = 97.6:2.1:0.3$ by weight ratio and $SiO_2:Al_2O_3:Fe_2O_3 = 80:1:0.08$ by molar ratio.

Subsequently, the NO eliminating ratio was evaluated in the same manner as in Example 30 and the results are shown in Table 4.

EXAMPLES 44 to 49

In the examples 44 to 49, only the temperature of the tubular reactor in the evaluation test of the catalyst in each of the Examples 30, 33, 36, 38, 39 and 40 was changed from 500° C. to 400° C. The results of the evaluation are shown in Table 5.

EXAMPLES 50 to 55

In the examples 50–55, only the temperature of the tubular reactor in the evaluation test of the catalyst in each of the Examples 30, 33, 36, 38, 39 and 40 was changed from 500° C. to 300° C. The results of the evaluation are shown in Table 5.

COMPARATIVE EXAMPLE 22

In this Comparative Example, only the temperature of the tubular reactor in the evaluation test for the catalyst in Comparative Example 21 was changed from 500° C. from 400° C. The results of the evaluation are shown in Table 5.

COMPARATIVE EXAMPLE 23

In this comparative example, only the temperature of the tubular reactor in the evaluation test of the catalyst in Comparative Example 21 was changed from 500° C. from 300° C. The results of the evaluation are shown in Table 5.

TABLE 5

| | | Catalyst system | | |
|---|---|---|---|---|
| | | Reaction temp. (°C.) | LPG addition amount (THC conc. %) | Total THC conc/ NOx conc | Denitrating ratio (%) |
| Examples | | | | | |
| 44 | Fe supporting/ galloaluminosilicate | 400 | 0.40 | 4.2 | 65 |
| 45 | Ni supporting/ galloaluminosilicate | 400 | 0.40 | 4.2 | 64 |
| 46 | Co supporting/ galloaluminosilicate | 400 | 0.40 | 4.2 | 60 |
| 47 | La supporting/ galloaluminosilicate | 400 | 0.40 | 4.2 | 60 |
| 48 | Cu supporting/ galloaluminosilicate | 400 | 0.40 | 4.2 | 63 |
| 49 | Zr supporting/ galloaluminosilicate | 400 | 0.40 | 4.2 | 66 |
| 50 | Fe supporting/ galloaluminosilicate | 300 | 0.40 | 4.2 | 45 |
| 51 | Ni supporting/ galloaluminosilicate | 300 | 0.40 | 4.2 | 43 |
| 52 | Co supporting/ galloaluminosilicate | 300 | 0.40 | 4.2 | 31 |

TABLE 5-continued

| | Catalyst system | | | |
|---|---|---|---|---|
| | Reaction temp. (°C.) | LPG addition amount (THC conc. %) | Total THC conc/ NOx conc | Denitrating ratio (%) |
| 53 La supporting/ galloaluminosilicate | 300 | 0.40 | 4.2 | 30 |
| 54 Cu supporting/ galloaluminosilicate | 300 | 0.40 | 4.2 | 40 |
| 55 Zr supporting/ galloaluminosilicate | 300 | 0.40 | 4.2 | 46 |
| Comparative Examples | | | | |
| 22 Fe supporting/ galloaluminosilicate | 400 | 0.40 | 4.2 | 19 |
| 23 Fe supporting/ galloaluminosilicate | 300 | 0.40 | 4.2 | 16 |

CONSIDERATION OF EXAMPLES AND COMPARATIVE EXAMPLES

As shown in Examples 29 to 43, by the method of purifying the exhaust gas of the examples, it can be seen that as high a denitrating ratio as 60 to 95% is obtained even when the oxygen concentration in the exhaust gases is high as 8% since the catalyst is used in which each of Fe, Co, Ni, Cu, Zr, Ce, Ti, Nb and La as the promoter was supported on the Ga-containing support made of galloaluminosilicate as the main catalyst and the evaluation test was conducted by setting the temperature at 500° C. and the total THC concentration/NOx concentration at 2.1 to 8.4 during the catalytic reaction.

Further, as can be seen, for example, from the comparison of Examples 29 to 31, the denitrating ratio was higher as the total THC concentration/NOx concentration was greater in the case of purifying the exhaust gas by using the same catalyst.

In contrast, Comparative Examples 15 to 20 used the same catalyst as Examples 29 to 40, but only as low a denitrating ratio as low as 3 to 10% was obtained since no LPG was added and the THC concentration/NOx concentration was 0.2 which was lower than the range according to the present invention.

According to Comparative Example 21, it can be seen that the denitrating ratio was as low as 21% as compared with Examples 29 to 43 because the catalyst contained no Ga as the main catalyst but the aluminosilicate and Fe as the promoter according to the present invention.

Further, according to Examples 44 to 49, it can be seen that although the denitrating ratio was lowered to 60 to 66% compared with Examples 29 to 40 since the reaction temperature was lowered from 500° C. in Examples 29 to 40 to 400° C., the denitrating ratio was high as compared with 19 to 23% of Comparative Example 3, 4, 22 in which no Ga was contained.

Further, according to Examples 50 to 55, it can be seen that since the reaction temperature was lowered from 500° C. in Examples 29 to 40 to 300° C., the denitrating ratio was as low as from 30 to 46% as compared with Examples 29 to 40, but high as compared with 16% of Comparative Example 23 in which the catalyst contained no Ga, so that they provided an excellent denitrating ratio though the reaction temperature was low.

EXAMPLE 56

A solution comprising 7.6 g of aluminum sulfate, 6.9 g of gallium nitrate, 26.4 of tetrapropylammonium bromide, 15.0 g of sulfuric acid (97%) and 250 ml of water (referred to as a solution I); a solution comprising 214 g of water glass ($SiO_2$:28.4% $Na_2O$:9.5%) and 212 ml of water (referred to as a solution II); and a solution comprising 80 g of sodium chloride and 122 ml of water (referred to as a solution III) were at first provided.

Then, the solutions I and II were gradually dropped into and mixed with the solution III. The mixed solution was adjusted to Ph 9.5 with sulfuric acid, charged in a one liter autoclave and left for 20 hours under an autogenous pressure at a temperature of 170° C. and under a stirring at 300 rpm. The mixed solution was cooled, filtered and precipitates were washed sufficiently with an excess amount of purified water. Subsequently, they were dried at 120° C. for 20 hours to synthesize a galloaluminosilicate zeolite of a ZSM-5 structure.

Subsequently, the zeolite was calcined in an air stream at 540° C. for 3 hours. Then, it was subjected to ion-exchange by using $1N-NH_4NO_3$ solution at 80° C. for 2 hours, filtration, washing with water, drying at 120° C. and calcination in an air stream at 720° C. for 3 hours. Subsequently, the catalyst was impregnated with a $K_2CO_3$ solution to support K on the precursor. The catalyst precursor thus obtained had an elemental composition of $SiO_2$:$Al_2O_3$:$Ga_2O_3$:$K_2O$ = 95.2:2.0:2.6:0.2 by weight ratio converted as oxide and $SiO_2$:$Al_2O_3$:$Ga_2O_3$:$K_2O$ = 79:1:0.7:0.1 by molar ratio.

Then, after charging 60 cc of the catalyst precursor into a tubular reactor made of stainless steel the temperature was gradually elevated while for introducing dry air at GHSV = 5000 $h^{-1}$, and the precursor was treated at 500° C. for 30 min to prepare a catalyst of this example.

Then, a gas formed by adding a LPG gas to a diesel exhaust gas as a gas for disposal was introduced at GHSV = 5000 $h^{-1}$ through a tube kept at 200° C. into the tubular reactor kept at 500° C. and an evaluation test was conducted for the catalyst. The composition of the diesel exhaust gas was: $NO_x$:1000 ppm, $O_2$:8%, $SO_x$:140 ppm, CO:400 ppm, $CO_2$:10% and THC:230 ppm. Further, the LPG gas was added by 0.19% at the THC concentration such that the total hydrocarbon in the gas for disposal was 0.21% of the total THC concentration. Accordingly, the total THC concentration/$NO_x$ concentration was 2.1.

Then, the gas from the exit of the tubular reactor was introduced through a tube kept at 200° C. into a chemical luminescence analyzer and the $NO_x$ concentration was measured. The $NO_x$ eliminating ratio of the exhaust gas after the catalytic reaction was calculated by measuring and comparing the $NO_x$ concentration before and after the introduction to the tubular reactor. The results are shown in Table 6 below.

EXAMPLES 57, 58

In Examples 57 and 58, the composition of the gas for disposal introduced into the tubular reactor charged with the catalyst upon evaluation test for the catalyst in Example 56 was changed as shown below. The results of the evaluation of the $NO_x$ eliminating ratio in each of the examples are shown in Table 6.

The gas for disposal introduced in Example 57 was obtained by adding an LPG gas of 0.40% a the THC concentration to the diesel exhaust gas in Example 56 such that the total hydrocarbon was 0.42% at the total THC concentration in the gas for disposal.

The gas for disposal introduced in Example 58 was obtained by adding an LPG gas of 0.82% at the THC concentration to the diesel exhaust gas in Example 56 such that the total hydrocarbon was 0.84% at the total THC concentration in the gas for disposal.

EXAMPLE 59

In this example, a $Ba(NO_3)_2$ solution was used instead of the $K_2CO_3$ solution upon preparing the catalyst in Example 56. The catalyst precursor in this example had an elemental composition of $SiO_2:Al_2O_3:Ga_2O_3:BaO = 95.2:2.0:2.6:0.2$ by weight ratio when converted to an oxide and $SiO_2:Al_2O_3:Ga_2O_3:BaO = 79:1:0.7:0.07$ by molar ratio.

Subsequently, the $NO_x$ eliminating ratio was evaluated in the same manner as in Example 56 and the results are shown in Table 6.

EXAMPLES 60. 61

In Examples 60 and 61, the composition of the gas for disposal introduced in the tubular reactor charged with the catalyst upon evaluation test of the catalyst in Example 59 was changed as shown below. The results of the evaluation of the $NO_x$ eliminating ratio in each of the examples are shown in Table 6.

The gas for disposal introduced in Example 60 was obtained by adding an LPG gas of 0.40% for THC concentration to the diesel exhaust gas in Example 59 such that the total hydrocarbon was 0.42% at the total THC concentration in the gas for the disposal.

The gas for disposal introduced in Example 61 was obtained by adding an LPG gas of 0.82% for the THC concentration to the diesel exhaust gas in Example 59 such that the total hydrocarbon 0.84% at the total THC concentration in the gas for disposal.

EXAMPLE 62

In this example, the concentration of $K_2CO_3$ in the $K_2CO_3$ solution was so changed that the amount of K supported in the catalyst was decreased by one half upon preparing the catalyst in Example 56. The catalyst precursor in this example had an elemental composition of $SiO_2:Al_2O_3:Ga_2O_3:K_2O = 95.3:2.0:2.6:0.1$ by weight ratio when converted to an oxide and $SiO_2:Al_2O_3:Ga_2O_3:K_2O = 80:1:0.7:0.05$ by molar ratio.

Subsequently, the $NO_x$ eliminating ratio was evaluated in the same manner as in Example 56 and the results are shown in Table 6.

EXAMPLE 63

In this example the concentration of $K_2CO_3$ in the $K_2CO_3$ was so changed so that the amount of K supported in the catalyst was increased to by a factor of 2.5 upon preparing the catalyst in Example 56. The catalyst precursor in this example had an elemental composition of $SiO_2:Al_2O_3:Ga_2O_3:K_2O = 94.9:2.0:2.6:0.5$ by weight ratio when converted to an oxide and $SiO_2:Al_2O_3:Ga_2O_3:K_2O = 79.1:1:0.7:0.25$ by molar ratio.

Subsequently, the $NO_x$ eliminating ratio was evaluated in the same manner as in Example 56 and the results are shown in Table 6.

TABLE 6

| Examples | Catalyst system | Reaction temp. (°C.) | LPG addition amount (THC conc. %) | Total THC conc/ NOx conc | Denitrating ratio (%) |
|---|---|---|---|---|---|
| 56 | 0.2% $K_2O$/ galloaluminosilicate | 500 | 0.19 | 2.1 | 53 |
| 57 | 0.2% $K_2O$/ galloaluminosilicate | 500 | 0.40 | 4.2 | 65 |
| 58 | 0.2% $K_2O$/ galloaluminosilicate | 500 | 0.82 | 8.4 | 82 |
| 59 | 0.2% BaO/ galloaluminosilicate | 500 | 0.19 | 2.1 | 50 |
| 60 | 0.2% BaO/ galloaluminosilicate | 500 | 0.40 | 4.2 | 62 |
| 61 | 0.2% BaO/ galloaluminosilicate | 500 | 0.82 | 8.4 | 80 |
| 62 | 0.1% $K_2O$/ galloaluminosilicate | 500 | 0.19 | 2.1 | 52 |
| 63 | 0.5% $K_2O$/ galloaluminosilicate | 500 | 0.19 | 2.1 | 50 |

COMPARATIVE EXAMPLE 24

Using the catalyst as prepared in Example 56, the same evaluation test of the catalyst as in Example 56 was conducted by introducing a diesel exhaust gas to which the LPG gas was not added into the tubular reactor. The results are shown in Table 7.

TABLE 7

| Control Example | Catalyst system | Reaction temp. (°C.) | LPG addition amount (THC conc. %) | Total THC conc/ NOx conc | Denitrating ratio (%) |
|---|---|---|---|---|---|
| 24 | 0.2% $K_2O$/ galloaluminosilicate | 500 | 0 | 0.2 | 4 |

EXAMPLES 64–67

In order to examine the thermal resistance and durability, the catalysts of Examples 29, 35, 38, 41 were used as catalysts of Examples 64–67 and heated at 500 and 800° C. for 5 hours in an atmosphere of a model gas in an oxygen-excessive lean state of a gasoline car (air-fuel (A/F) ratio is about 22). The composition of the model gas was: CO:0.5%; $O_2$:8%; $H_2$:0.2%; $CO_2$:9%; $C_3H_6$:0.1% (THC: 3000ppm); and NO:1000 ppm.

The resulting powdered catalysts thus heated were pressed and shaped into pellets with a diameter of about 3 mm. These pellets were filled into an experimental catalyst converter. An exhaust model gas in an excessive-oxygen lean state of a gasoline car was introduced into the converter. The NO purification ratios were measured 400, 500 and 600° C. The composition of these model gass was: CO:0.1%; $O_2$:4%; $CO_2$:10%; $C_3H_6$:0.05%(THC:1500 ppm); and NO:700 ppm. The space hourly rate GHSV in the measurement was about 30,000h$^{-1}$. The respective results of the Examples are shown in Table-8 below.

TABLE 8

| | Catalyst system | | |
|---|---|---|---|
| Heating temp. (°C.) | NO purification ratio (%) Reaction temperature (°C.) | | |
| Examples | 400 | 500 | 600 |

TABLE 8-continued

| | | Catalyst system | | | |
|---|---|---|---|---|---|
| | | Heating temp. (°C.) | NO purification ratio (%) Reaction temperature (°C.) | | |
| | | | 400 | 500 | 600 |
| 64 | Fe supporting/ gallo- aluminosilicate | before heated | 50 | 62 | 69 |
| | | 500 | 50 | 61 | 67 |
| | | 600 | 45 | 58 | 61 |
| 65 | Co supporting/ gallo- aluminosilicate | before heated | 46 | 58 | 64 |
| | | 500 | 46 | 58 | 64 |
| | | 600 | 42 | 54 | 57 |
| 66 | La supporting gallo- aluminosilicate | before heated | 44 | 56 | 61 |
| | | 500 | 44 | 55 | 60 |
| | | 600 | 40 | 52 | 55 |
| 67 | Ce supporting/ gallo- aluminosilicate | before heated | 48 | 60 | 66 |
| | | 500 | 48 | 59 | 64 |
| | | 600 | 43 | 56 | 59 |

CONSIDERATION FOR EXAMPLES AND COMPARATIVE EXAMPLES

As shown in Examples 56 to 63, according to the method of purifying the exhaust gas of the examples, it can be seen that as high a denitrating ratio as 50 to 82% was obtained even when the oxygen concentration in the exhaust gases is as high as 8% since the catalyst in which K or Ba as the promoter was supported on the Ga-containing support galloaluminosilicate as the main catalyst was used and the evaluation test was conducted by setting the temperature at 500° C. and the total THC concentration/$NO_x$ concentration at 2.1 to 8.4 during the catalytic reaction.

In contrast, according to Comparative Example 24, though the same catalyst as that used in Examples 56 to 58 was used, only as low a denitrating ratio as 4% was obtained since the LPG was not added and the THC concentration/$NO_x$ concentration was 0.2 which was lower than the range according to the present invention in the evaluation test.

As shown in Examples 64 to 67, according to the method of purifying the exhaust gas of the examples, it can be seen that as high a purification ratio as 40 to 69% was obtained when the gas for disposal was an exhaust gas in an oxygen-excessive lean state of a gasoline engine.

The catalyst for purifying the exhaust gas according to the present invention has high catalytic activity even at a low temperature and a long catalyst life. Further, according to the method of purifying an exhaust gas using the above-mentioned catalyst, nitrogen oxides can be reduced and eliminated at high efficiency even if the concentration of oxygen in the exhaust gas is high.

We claim:

1. An exhaust gas purifying method comprising the steps of bringing an exhaust gas into contact with a catalyst containing (1) gallium, (2) at least one ingredient selected from the group consisting of cobalt, zirconium, niobium, potassium and barium and (3) a zeolite, in the presence of a hydrocarbon in an oxidative gas, thereby reducing and eliminating nitrogen oxides in said exhaust gas.

2. An exhaust gas purifying method defined in claim 1, wherein the nitrogen oxides in the exhaust gas are reduced and eliminated at a reaction temperature of from 200 to 800° C. and under the presence of a hydrocarbon at a total THC concentration/$NO_x$ concentration ratio of from 0.5 to 50.

3. An exhaust gas purifying method defined in claim 1, wherein said at least one ingredient is selected from the group consisting of niobium, potassium and barium.

* * * * *